Nov. 3, 1959 — F. H. PARKER — 2,911,009
MIXING VALVE
Filed Nov. 20, 1956 — 2 Sheets-Sheet 1

INVENTOR.
FRANK H. PARKER
BY Frank H. Harmon
ATTORNEY

Nov. 3, 1959   F. H. PARKER   2,911,009
MIXING VALVE
Filed Nov. 20, 1956   2 Sheets-Sheet 2
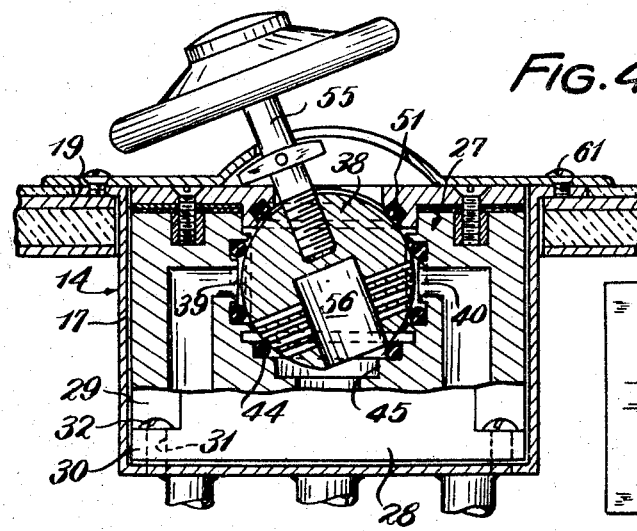
Fig. 4
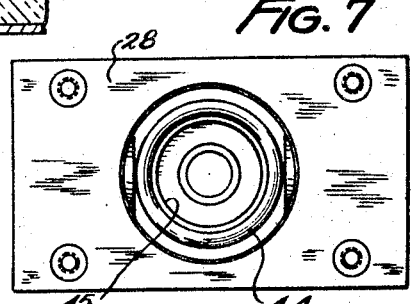
Fig. 7
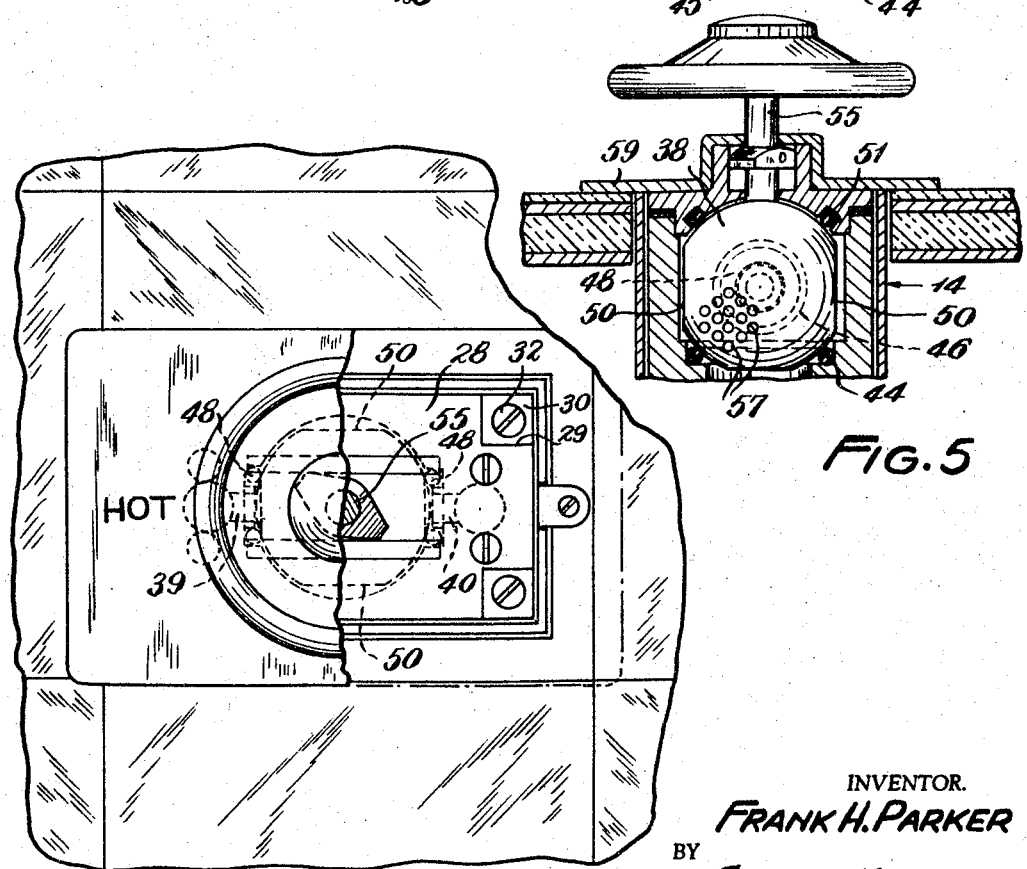
Fig. 5
Fig. 6
INVENTOR.
FRANK H. PARKER
BY Frank H. Harmon
ATTORNEY

2,911,009
Patented Nov. 3, 1959

---

2,911,009

MIXING VALVE

Frank H. Parker, Cleveland Heights, Ohio, assignor to Stephen C. Peplin, Westlake, Ohio, trustee Application November 20, 1956, Serial No. 623,392

4 Claims. (Cl. 137—625.41)

---

The present invention relates to a plumbing fixture, and more particularly, to a plumbing fixture, preferably a mixing valve, which is mounted in a wall.

An important object of the present invention is to provide a new and improved plumbing system which includes a box readily connected to and disconnected from the fluid connetcion, the fixture preferably being a mixing valve having a ball valve member for controlling the mixing of fluid from two sources with the valve member being readily removable from the fixture without removing the fixture from the wall.

Another object is to provide, in a plumbing system for a building, a wall-mounted box having at least hot and cold water pipes extending from the bottom thereof, and preferably also a discharge pipe for mixed hot and cold water, to permit a valve for controlling the flow of hot and cold water to an outlet or the discharge pipe to be readily and conveniently connected into the plumbing system of which the box is a part.

Another object of the present invention is to provide a new and improved plumbing fixture, particularly a fixture of the valve type, adapted for wall mounting and in which the connection of the fixture to a conduit is accomplished by merely mounting the fixture in the wall, the making of the connection preferably only requiring the use of a single tool such as a screw driver.

Another object of the present invention is to provide plumbing fixtures of the type referred to in which a ball valve for controlling the flow of fluid in the plumbing fixture has flats on its opposite sides so that the ball valve may be quickly and easily removed and replaced and as to provide ready access to the sealing O rings around the inlet parts.

Further objects and advantages will be apparent from the following detailed description of the preferred embodiment made with reference to the accompanying drawings forming a part of this specification and in which:

Fig. 4 is a sectional view similar to Fig. 1 but showing the valve member of the mixing valve in a position permitting flow from only one of the conduits leading to the valve;

Fig. 5 is a detached elevational view of the valve member and operating handle;

Fig. 6 is a plan view of the valve shown in Fig. 1; and

Fig. 7 is a plan view of the valve body of Fig. 1 with the ball valve removed.

Conventionally plumbing connections have been made as needed and the making of such conventional connections requires threading tools, considerable pipe work, and oftentimes soldering equipment. The present invention contemplates the provision of walls provided with plumbing boxes to which hot and cold water connections and preferably a discharge connection are made when the wall is constructed and which will permit the connection of a valve at any subsequent time.

While the present invention is susceptible of various modifications and constructions and of embodiment in various type plumbing fixtures, it is herein shown and described as embodied in a wall mounted mixing valve for which it is particularly suitable.

Figure 1:
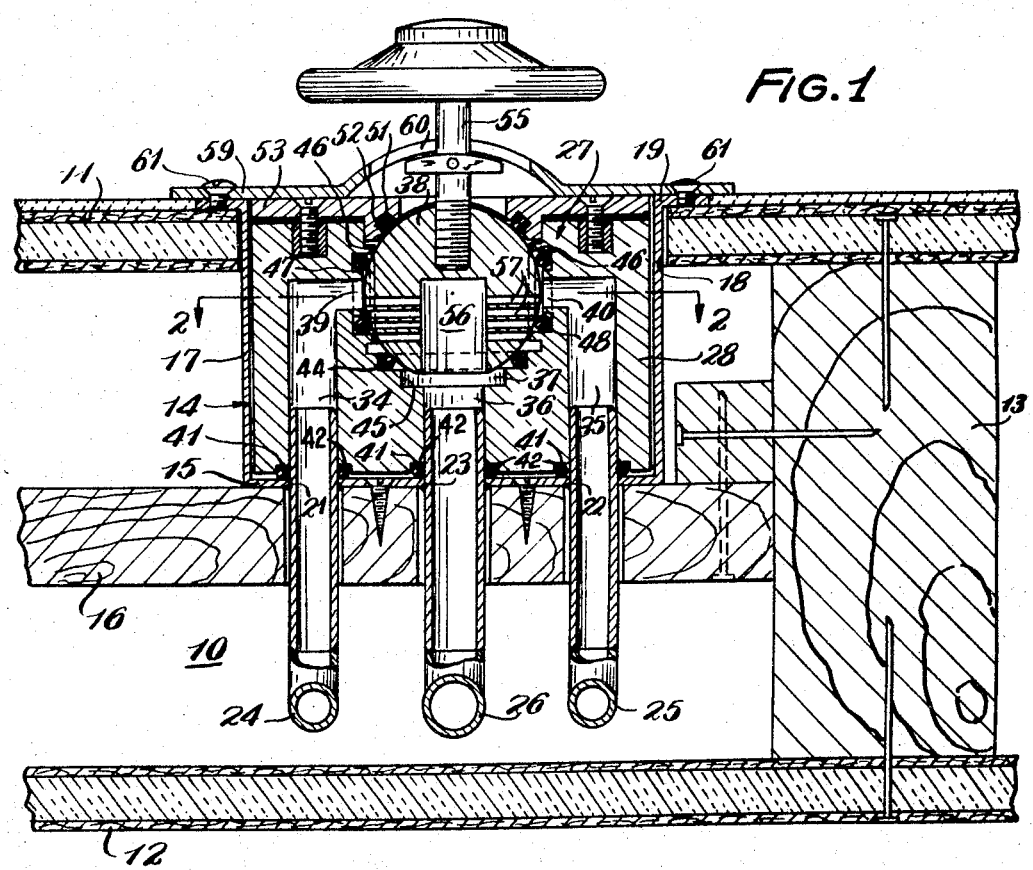
Fig. 1 is a sectional view of a wall having a mixing valve therein which is constructed and mounted in accordance with the present invention.

Referring to the drawings, a building wall 10 is in horizontal cross section in Fig. 1. The wall 10 includes spaced exterior members 11, 12 joined by studs 13, only one of which appears in the drawing, and an open top box 14 having a bottom 15 supported by an internal wall member 16. The bottom of the box is fixed to the internal wall member 16 and the side walls 17 of the box extend from the internal wall member 16 through an opening 18 in the exterior member 11 and have flanges 19 which overlie the exterior member.

In the illustrated and preferred embodiment the bottom of the box 14 has openings 21, 22, 23 therein and a cold water pipe 24, a hot water pipe 25, and a discharge pipe 26 extending through the openings 21, 22, 23, respectively, into the box. The discharge pipe is intermediate the hot and cold water pipes. The box as thus far described is preferably installed at the time of constructing the wall 10 and if not used at the time of building, the box may be covered with a face plate until such time as it is desired to install a plumbing fixture. Suitable cut-off valves may be provided to isolate the open ends of the pipes 24, 25, 26 from the remainder of the plumbing system or the pipes may be capped until connection to a plumbing fixture.

The conduits 24, 25, 26 are shown in the drawing as connected to a mixing valve 27. The mixing valve 27 is shown as having a rectangular body 28 which fits within the box 14 and conforms generally in configuration with the shape of the box 14 and has cut-out portions 29 adjacent each corner thereof to provide a lug 30 at each corner adjacent the bottom wall 15. The lugs 30 have openings 31 for receiving bolts 32 which thread into the bottom wall 15 to secure the valve body to the bottom of the box 14. The cut-out portions 29 provide access to the bolts from the open side of the box.

The valve body 28 has three passages 34, 35, 36 therein which extend perpendicularly to the bottom wall 15 and which are respectively aligned with the openings 21, 22, 23 and receive the corresponding pipes 24, 25, 26. The passage 36 is positioned intermediate the passages 34, 35 and opens into the bottom of a valve chamber 37 in which a ball valve 38 is positioned while the conduits 34, 35 communicate with ports 39, 40 which open into the side wall at points opposite to each other of the valve chamber 37 and which are circular in configuration.

A seal is provided between the valve body 28 and each of the pipes 24, 25, 26 by a sealing member 41 here shown as an O-ring positioned about each of the pipes 24, 25, 26 adjacent the inner side of the bottom wall 15 of the box. The passages 34, 35, 36 are each counterbored as indicated at 42 to provide recesses for receiving the sealing members 41 and surfaces for applying a sealing pressure to the adjacent sealing member 41 to effect a seal between the valve body 28 and the conduits 24, 25, 26. It will be understood by those skilled in the art that when the bolts 32 are tightened the sealing members 41 will have a pressure exerted thereon which will effect a tight seal. It will be noted that the valve body 28 is of slightly less depth than the depth of the box.

The valve chamber and the ball valve 38 are constructed so that the ball valve may be quickly and easily removed from the chamber. As is best shown in Figs. 1 and 7, the valve chamber 37 is of cylindrical configuration and opens into the outer side of the valve body adjacent the open top of the box 14. The ball valve 38 is positioned in the chamber 37 and rests on a bearing ring 44 positioned in a counterbore 45 in the bottom of the valve chamer. The ports 39, 40 open into the side wall of the valve chamber at diametrically opposed points which lie on a diameter of the chamber that passes through the center of the ball valve 38. An annular wall portion 46 encircles each port 39, 40 and extends inwardly of the chamber with the outer ends of each annular portions terminating in a chordal plane of the ball valve 38. The annular portions are chamfered at their outer ends and each have an annular recess 47 inwardly of the chamfered ends in which a sealing member 48, or O-ring, is positioned. The annular portions define annular valve seats which engage the spherical ball valve in chordal planes and permit rotation of the valve but not axial movement thereof.

While the valve seats defined by the portions 46 normally prevent the removal of the ball valve 38, the ball valve is provided with diametrically opposed flats 50 which upon rotation of the ball valve may be moved adjacent to the annular portions 46. When the ball valve is so positioned it may be readily removed from the valve chamber 37.

The ports 39, 40 have been shown as diametrically opposed to each other. It will be understood that the ports may be otherwise located and the relationship of the flats 50 correspondingly changed.

A seal is also effected between the ball valve 38 and the valve body 16 by an O-ring 51 which engages the ball valve 38 adjacent the outer end of the valve chamber 37. The O-ring 51 is positioned in a recess 52 in a plate 53 connected to the top of the valve body 28 adjacent the open side of the box 14 by screws 54. The plate 43 includes a portion which fits within the open end of the valve chamber 37 and which has the recess 52 formed therein.

Figure 2:
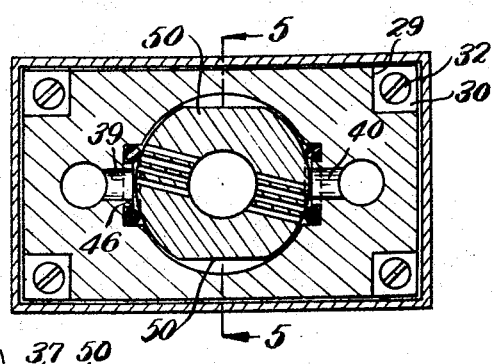
Fig. 2 is a sectional view taken approximately along line 2—2 of Fig. 1.
Figure 3:
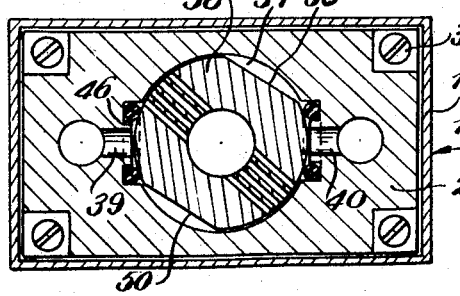
Fig. 3 is a view similar to Fig. 2 but showing the valve member rotated to its "off" position.

The ball valve 38 is constructed and functions in a manner fully described in my copending application Serial No. 441,332, filed July 6, 1954, now Patent No. 2,845,949, issued August 5, 1958, and the description therefore, will not be repeated in detail. Suffice it to say that the ball valve has an operating handle 55 which extends outwardly from the open end of the valve chamber and a radial bore 56 which opens into the portion of the ball valve facing the bottom of the valve chamber 37 and which extends to approximately the center of the ball valve. The ball valve is also provided with a plurality of chordal passages 57 extending through the ball valve transversely of the bore 56 and intersecting the latter. The chordal passages are positioned in the innermost half of the ball valve and extend between the arcuate portions of the valve which join the flats 50 and are disposed so that the ball valve 38 may be rotated to a position where the O-ring of port 39 is in engagement with the arcuate portion between one end of the chordal passages 57 and one of the flats 50 and the O-ring 48 of port 40 is in sealing engagement with the arcuate portion of the ball valve between the other end of the chordal passages 57 and the other flat 50. In this position, which is shown in Fig. 3, the ball valve prevents flow from the ports 39, 40 into the bore 56 and the valve is in an "off" position. From the position shown in Fig. 3 the valve may be rotated as shown in Figs. 1 and 2 to mix a fluid from the ports 39, 40 in equal proportions as long as the rotation of the valve takes place about the axis of the chamber 37. The degree of angular displacement from the position shown in Fig. 3 determines the volume of flow. The proportion of the hot and cold water supply to the bore 56 may be varied by rotating the ball about an axis perpendicular to the plane containing ports 39, 40. This will cause movement of one end of the chordal passages 57 into fuller registry with one end of the ports 39, 40 while removing the other ends of the chordal passages from registry with the other port, as is best shown in Fig. 4.

To provide a pleasing fixture, the valve may be covered with a face plate 59 which has a slot 60 therein for permitting the swinging of the operating handle for the ball valve 38 in the plane necessary to control the proportion of mixing between the hot and cold water supplies. The face plate 59 does not have a connection with the wall 11 but is bolted to the flanges 19 of the box by screws 61.

It can now be seen that the present invention provides a plumbing fixture which is quickly and easily installed in a wall and where connection is made to the necessary conduits by merely assembling the fixture in the wall. The construction is such that the fixture is extremely pleasing in appearance and such that the fixture may be quickly and easily removed, or, if the fixture is a ball valve, the construction is such that the ball valve itself may be quickly and easily removed from the fixture.

While the preferred embodiment of the present invention has been described in considerable detail, further changes and modifications will be apparent to those skilled in the art and it is hereby my intention to cover all construction and arrangements and modifications which fall within the ability of those skilled in the art and the scope of the appended claims.

What I claim is:

1. A plumbing fixture comprising a valve body having a cylindrical valve chamber opening into one side thereof, said chamber having a bottom opposite said one side, opposed inlet passages and an outlet passage in the valve body in communication with the valve chamber, a ball valve disposed in said chamber, said ball valve having a radial bore and chordal passages therein extending between said inlet passages and communicating with the radial bore, said radial bore being in communication with the bottom of the valve chamber, said valve body having a discharge bore opening into the bottom of the valve chamber, opposed annular portions extending radially inwardly from the said side wall of said chamber with the axes of said portions being along a diameter of said ball valve, said inlet and outlet passages opening within said annular portions, said annular portions defining valve seats engaging said ball valve and limiting the movement thereof axially of said chamber, said ball valve having diametrically opposed flats disposable opposite said annular portions to permit movement of said ball valve axially of said chamber, and a sealing member in each of said annular portions for sealing said ball valve.

2. A plumbing fixture comprising a valve body, a ball valve chamber, a ball valve in said chamber, said body having an opening smaller than the normal diameter of the ball valve and communicating with the valve chamber, a removable cover for said opening, said body also having an inlet passage and an outlet passage both in communication with the valve chamber, opposed annular portions extending radially inwardly from a side wall of said chamber with the axes of said portions being along a diameter of the ball valve, said inlet passage opening within one of the annular portions, said annular portions defining valve seats engaging said ball valve and limiting movement thereof axially of the chamber, and a sealing member in each of the annular portions for sealing the ball valve, said ball valve having an axial bore, and a chordal passage communicating said bore with the inlet passage, said bore being also in communication with said outlet passage in the body, said ball valve having diametrically opposed flat surfaces formed in its sides opposite said chordal passage and disposable opposite said annular portions to permit movement of the ball valve axially of said chamber.

3. A plumbing fixture comprising a valve body, a ball valve chamber, a ball valve in said chamber, said body having an opening smaller than the normal diameter of the ball and communicating with the valve chamber, a removable cover for said opening, said body also having a pair of opposed inlet pasages and an outlet passage, opposed annular portions extending radially inwardly from a side wall of said chamber with the axes of said portions being along a diameter of the ball valve, said inlet passages opening within the annular portions, said annular portions defining valve seats engaging said ball valve and limiting movement thereof axially of the chamber, and a sealing member in each of the annular portions for sealing the ball valve, said ball valve having an axial bore and a chordal passage communicating said bore with the inlet passages, said bore being also in communication with said outlet passage in the body, said ball valve having diametrically opposed flat surfaces formed in its sides opposite said chordal passage and disposable opposite said annular portions to permit movement of the ball valve axially of said chamber.

4. A plumbing fixture comprising a valve body, a ball valve chamber, a ball valve in said chamber, said body having an opening smaller than the normal diameter of the ball and communicating with the valve chamber, a removable cover for said opening, said body also having a pair of opposed inlet passages and an outlet passage, opposed annular portions extending radially inwardly from a side wall of said chamber with the axes of said portions being along a diameter of the ball valve, said inlet passages opening within the annular portions, said annular portions defining valve seats engaging said ball valve and limiting movement thereof axially of the chamber, and a sealing member in each of the annular portions for sealing the ball valve, said ball valve having an axial bore and a plurality of substantially parallel chordal passages communicating said bore with the inlet passages, said bore being also in communication with said outlet passage in the body, said ball valve having diametrically opposed flat surfaces formed in its sides opposite said chordal passages and disposable opposite said annular portions to permit movement of the ball valve axially of said chamber.

References Cited in the file of this patent

UNITED STATES PATENTS

| | | |
|---|---|---|
| 1,478,688 | Whidden | Dec. 25, 1923 |
| 1,614,437 | Cochran | Jan. 11, 1927 |
| 2,297,161 | Newton | Sept. 29, 1942 |
| 2,373,628 | Gleeson | Apr. 10, 1945 |
| 2,592,062 | Perry | Apr. 8, 1952 |
| 2,725,894 | Mamoli | Dec. 6, 1955 |